United States Patent
Heller et al.

(10) Patent No.: US 6,840,564 B2
(45) Date of Patent: Jan. 11, 2005

(54) COVER DEVICE FOR THE REMOVABLE ROOF OF A CONVERTIBLE AND A CONVERTIBLE WITH SUCH A COVER DEVICE

(75) Inventors: Alexander Heller, Stockdorf (DE); Burkhard Reinsch, Kaufbeuren (DE)

(73) Assignee: Open Air Systems GmbH, Stockdorf (DE)

( * ) Notice: Subject to any disclaimer, the term of this patent is extended or adjusted under 35 U.S.C. 154(b) by 0 days.

(21) Appl. No.: 10/627,598

(22) Filed: Jul. 28, 2003

(65) Prior Publication Data

US 2004/0017093 A1 Jan. 29, 2004

(30) Foreign Application Priority Data

Jul. 28, 2002 (DE) .......................................... 102 34 350

(51) Int. Cl.[7] ................................................. B60J 7/00
(52) U.S. Cl. .............................. 296/107.08; 296/136.06
(58) Field of Search ....................... 296/136.06, 107.08, 296/76

(56) References Cited

U.S. PATENT DOCUMENTS

| | | | | | |
|---|---|---|---|---|---|
| 2,992,042 | A | * | 7/1961 | Gilson et al. | 296/136.06 |
| 6,145,915 | A | * | 11/2000 | Queveau et al. | 296/107.08 |
| 6,386,615 | B2 | * | 5/2002 | Neubrand et al. | 296/76 |
| 6,511,118 | B2 | * | 1/2003 | Liedmeyer et al. | 296/107.17 |
| 2004/0017092 | A1 | * | 1/2004 | Antreich | 296/107.08 |
| 2004/0036312 | A1 | * | 2/2004 | Eichholz et al. | 296/107.08 |

FOREIGN PATENT DOCUMENTS

| DE | 44 27 442 C1 | 12/1995 |
|---|---|---|
| DE | 44 45 941 C1 | 3/1996 |
| DE | 197 13 348 C1 | 7/1998 |
| DE | 199 43 860 A1 | 3/2001 |
| DE | 100 39 682 A1 | 3/2002 |

* cited by examiner

Primary Examiner—Joseph D. Pape
(74) Attorney, Agent, or Firm—Nixon & Peabody LLP; David S. Safran

(57) ABSTRACT

A cover device for the roof (2) of a convertible type motor vehicle, which roof can be deposited in the rear area of the vehicle, the cover device being movably supported to clear a through opening for the roof (2) and having a rear cover part (5) which is movably supported on the body and a front cover part (11) which is supported on the rear cover part (5) and can be moved between a cover position in which it extends forward from the rear cover part (11), and a deposited position in which it is located under the rear cover part (5). The front cover part (11) can be moved by a first bearing mechanism (12, 13, 14) relative to the rear cover part (5) in the lengthwise direction and can be raised and lowered by a second bearing mechanism (15, 16) relative to the rear cover part (11).

19 Claims, 7 Drawing Sheets

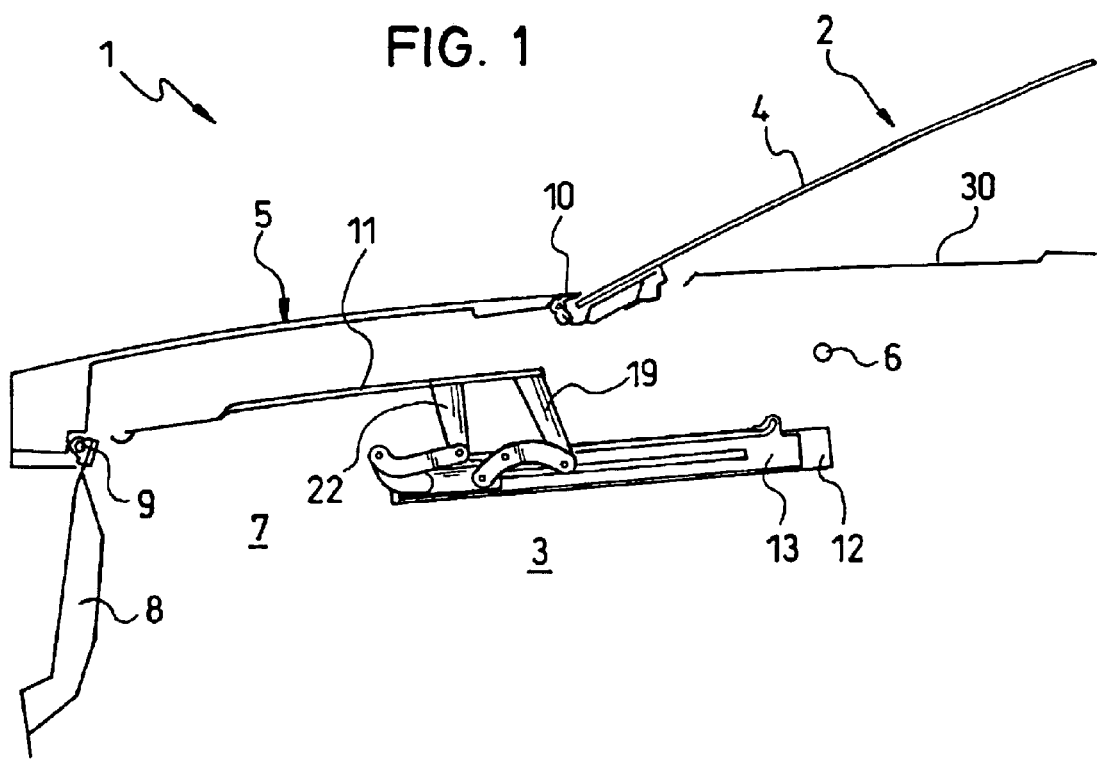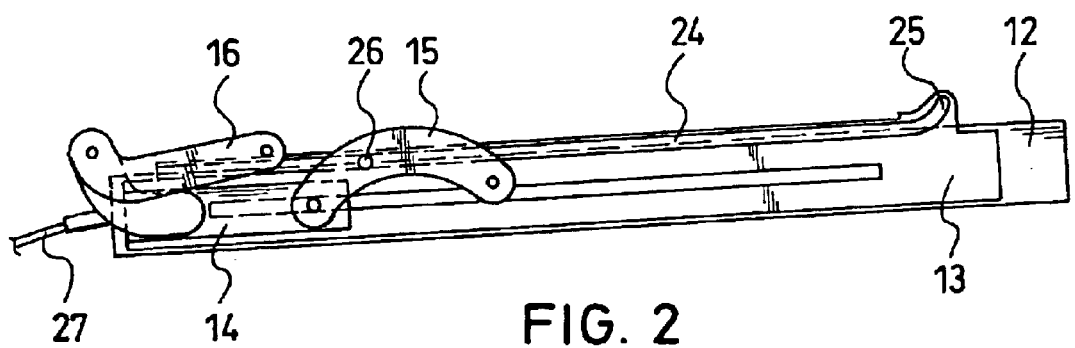

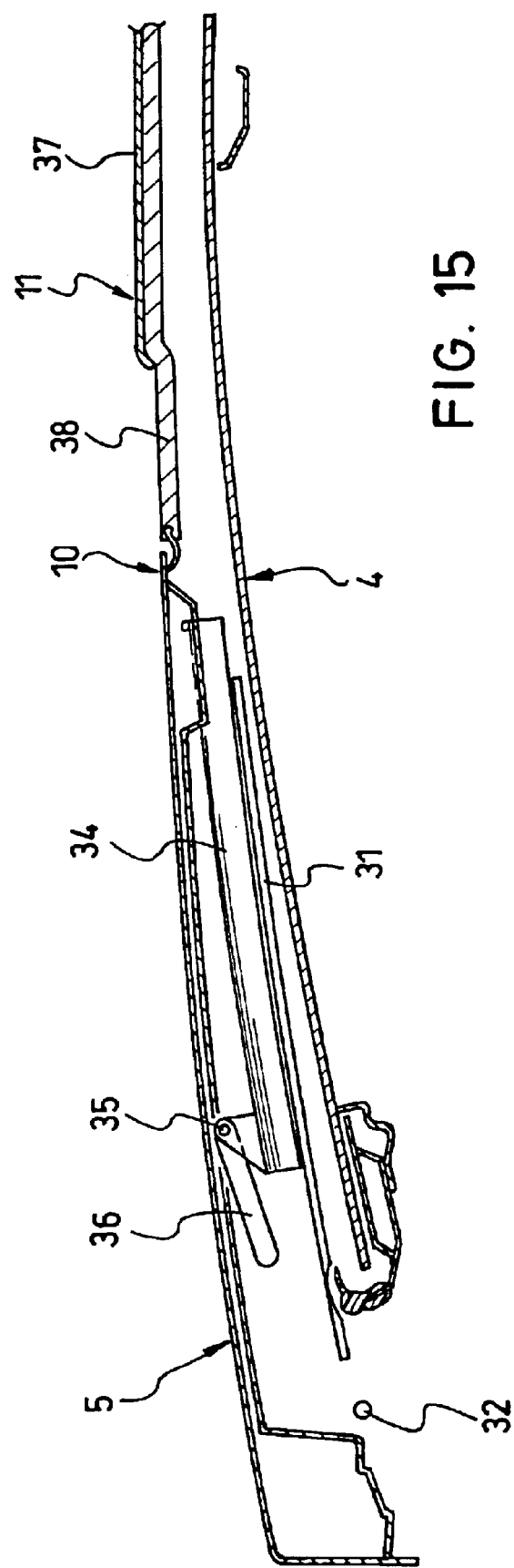

COVER DEVICE FOR THE REMOVABLE ROOF OF A CONVERTIBLE AND A CONVERTIBLE WITH SUCH A COVER DEVICE

BACKGROUND OF THE INVENTION

1. Field of the Invention

The invention relates to a cover device for the roof of a convertible, which roof can be deposited in the rear area of the vehicle. In particular, the invention relates to such a cover device which is movably supported to clear an opening in the roof, and having front and rear cover parts, the rear cover part being movably supported on the vehicle body and the front cover part being supported on the rear cover part for movement between a cover position extending forward from the rear cover part, and a deposited position in which it is located under the rear cover part. The invention also relates to a convertible vehicle with such a cover device.

2. Description of Related Art

Published German Patent Application DE 199 43 860 A1 discloses a cover device of a convertible in which a cover part which covers the storage space for a convertible top is movably supported to clear an opening in the roof and there is an extensive extension which can be adjusted by means of a four-bar device between a lowered position under the cover with the roof closed and a cover position in front of the cover with the roof opened. The four-bar device, on each side of the roof, has a quadruple joint with two pivot rods which are supported to be able to pivot around pivot axes which are fixed on the cover part, and which rods adjust the extension in a combined pivoting-sliding motion so that the top of the extension faces upward in all positions. The possible displacement path of the extension between its two end positions is limited by the length of the two connecting rods of the quadruple joint, long connecting rods requiring a large path swinging motion.

SUMMARY OF THE INVENTION

A primary object of the present invention is to devise a cover device of the initially mentioned type in which the extension can be adjusted by improved bearing means, and to make provide a convertible vehicle with such a cover device.

The indicated object is achieved in accordance with the invention in that the front cover part can be moved by a first bearing means relative to the rear cover part in the lengthwise direction and can be raised and lowered by a second bearing means relative to the rear cover part. By dividing the bearing of the front cover part among two bearing means, a lowering motion is enabled which requires only a small path of motion. Furthermore, an additional, likewise, space-saving linear motion, for example, which takes place essentially parallel to the rear cover part, is sufficient to move the lowered front cover part to under the rear cover part.

Preferably, the first bearing means contains a first guide rail which is supported on the rear cover part and a second guide rail which is movably supported on the first guide rail and can be extended forward and bears the front cover part. According to a preferred embodiment, if the first guide rail is securely mounted on the rear cover part, the second bearing means contains a lifting means for raising and lowering the front cover part. Thus, in addition to an extension lengthwise motion, a lifting motion can also be produced.

One simple configuration calls for the second bearing means to be a multi-bar mechanism, and especially a four bar mechanism, which supports the front cover part on the second guide rail. However, there can also be spindle drives or scissors mechanisms for vertical adjustment of the front cover part.

Feasibly, the second bearing means or the multi-bar or four bar mechanism is supported on a carriage which is supported to be able to move longitudinally on the second guide rail. For lift control, the second guide rail can has a guide path which is in controlling engagement with a control part of the first bearing means and controls lifting or lowering of the front cover part. Here, the four bar mechanism preferably has a control rod which contains the control part and a second rod which is pivotally coupled, on the one hand, to the carriage, and on the other hand, to the front cover part. Then, the guide path on the front section of the second guide rail can have a control section which deflects the control part up, and thus, swings the control rod up when the carriage is moved into its front end position. In this way, simple and reliable mechanical control of movement is provided.

In one alternative configuration, the second bearing means has a pivot bearing which supports the first guide rail on its rear section for a vertical swinging motion relative to the rear cover part. Then, the extended front cover part can carry out its lifting motion by pivoting the first guide rail. An especially mechanically acting adjustment mechanism for swinging the first guide rail can be located in a dynamic connection between it and the rear cover part.

The rear cover part is preferably a trunk lid which is supported around a rear pivot axis on the body, and the front cover part forms a cover of the convertible top compartment. Furthermore, the front cover part can have two elements which can be displaced relative to one another in the lengthwise direction and which can be deposited in the stowed position on top of one another to save space.

The cover device is suitable for covering removable hardtop vehicle rooves with two roof parts and also with three or more roof parts and also for soft top rooves with a convertible top cover which is held on a fixed frame.

The cover device is explained in detail with reference to a single embodiment and the accompanying drawings.

BRIEF DESCRIPTION OF THE DRAWINGS

FIG. 1 is a schematic lengthwise partial sectional view of a rear area of a convertible with a cover device in accordance with the invention;

FIG. 2 is an enlarged side view of a bearing means for the movable cover of the convertible top compartment of the cover device;

FIG. 15 is a schematic side view as shown in FIG. 11, the cover of the convertible top compartment having been swung into its front cover position.

DETAILED DESCRIPTION OF THE INVENTION

Figure 3:
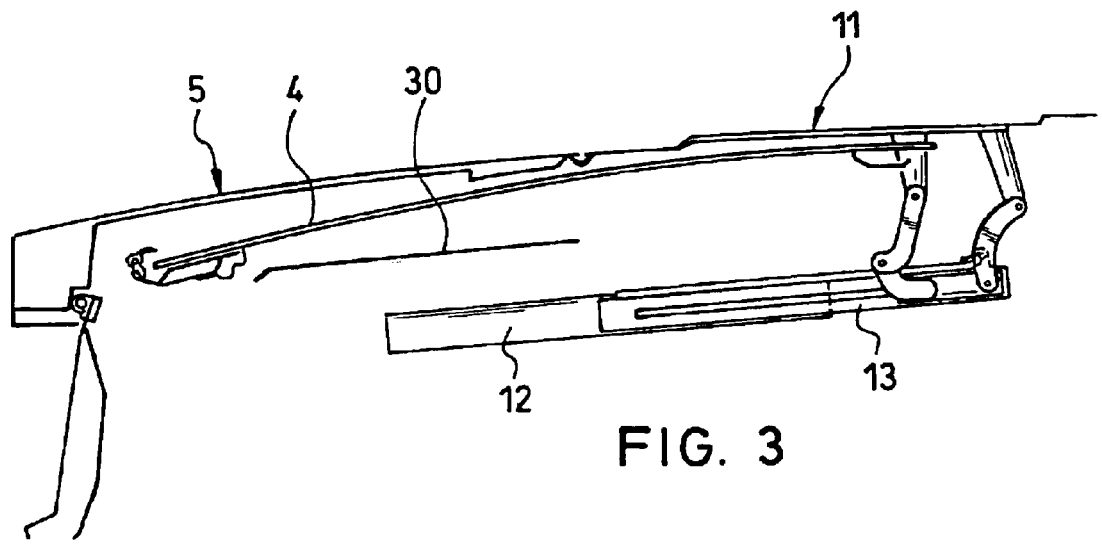
FIG. 3 is a view similar to that shown in FIG. 1, but with the cover of the convertible top compartment as a front extension of the trunk lid with the roof opened.

A convertible vehicle 1 (in FIG. 1, only its rear area is shown schematically) contains a movable roof 2 which can be lowered for opening and which can be displaced between a closed position and an open position in which it is deposited in a rear stowage space or convertible top compartment 3. The roof 2 according to this embodiment is a movable hardtop with several rigid roof parts which are located in succession in the closed position, as is disclosed, for example, as in published German Patent Application DE 199 43 860 A1. However, alternatively, the roof can also be a flexible soft top with a foldable convertible top rod. The roof part 4 (FIG. 1) or the C column (which is the rear column in the closed position of the roof 2) adjoins a trunk lid 5 which is pivotally supported on the body by a pivot bearing means (not shown) to be able to pivot around a front pivot axis 6 (shown schematically) and can be swung up to clear a loading opening for loading and unloading the trunk 7. In doing so, a rear end wall 8, which is joined to the trunk lid 5, is swung together with the trunk lid 5. The rear end wall 8 closes a recess in the rear structure of the body which facilitates the loading and unloading of the trunk 7.

The trunk lid 5, which also covers the convertible top compartment 3, which occupies, for example, part of the trunk 7, is supported to pivot around a pivot axis 9 which is located in the area of the top edge of the rear end wall 8. The trunk lid 5 is swung up around pivot axis 9 at its front edge 10 for producing a through opening for the roof 2 so that the roof 2 can be deposited in the convertible top compartment 3 or can be extended out of it. When, for example, the three-part hardtop roof 2 is deposited, for example, the front roof part pivots onto the middle roof part (not shown) and the rear roof part 4 onto the front roof part. This compact unit then swings into the convertible top compartment 3.

The cover 11 of the convertible top compartment, as an extensive extension of the trunk lid 5, is supported on the trunk lid 5 such that it can be displaced between a lowered position under the trunk lid 5 with the roof 2 closed (FIG. 1) and a cover position in front of the trunk lid 5 in the direction of travel where it is flush with the trunk lid when it is closed (FIG. 3) and the roof stored. A bearing means for the cover 11 of the convertible top compartment, on each side underneath the trunk lid 5, contains an outer or rear guide rail 12 which is aligned in the lengthwise direction of the vehicle and which is permanently joined to the trunk lid 5, and an inner or forward guide rail 13 which is movably supported on the outer guide rail 12 and can be telescoped forward out of the rear inserted position (FIGS. 1 & 2).

On the inner guide rail 13, a carriage or a slider plate 14 is movably supported. A front control rod 15 and a rear connecting rod 16 of a four bar linkage is supported on the slider plate 14 and pivotally supports the cover 11 of the convertible top compartment. The front control rod 15 is supported to pivot around a pivot axis 17 on the slider plate 14 and around a pivot axis 18 on the front carrier part 19 of the cover 11 of the convertible top compartment. One end of the rear connecting rod 16 is supported on the upwardly protruding bearing arm 20, which is attached to the slider plate 14, to be able to pivot around a pivot axis 21 and the other end is connected to the rear carrier part 22 of the cover 11 of the convertible top compartment to be able to pivot around a pivot axis 23.

The inner guide rail 13 contains a guide path 24 which extends parallel to the guide of the slider plate 14 and on its front end has a deflection section 25 which is curved forwardly upward. A control pin 26 projects laterally from the control rod 15 and is movably held in the guide path 24.

Figure 9:
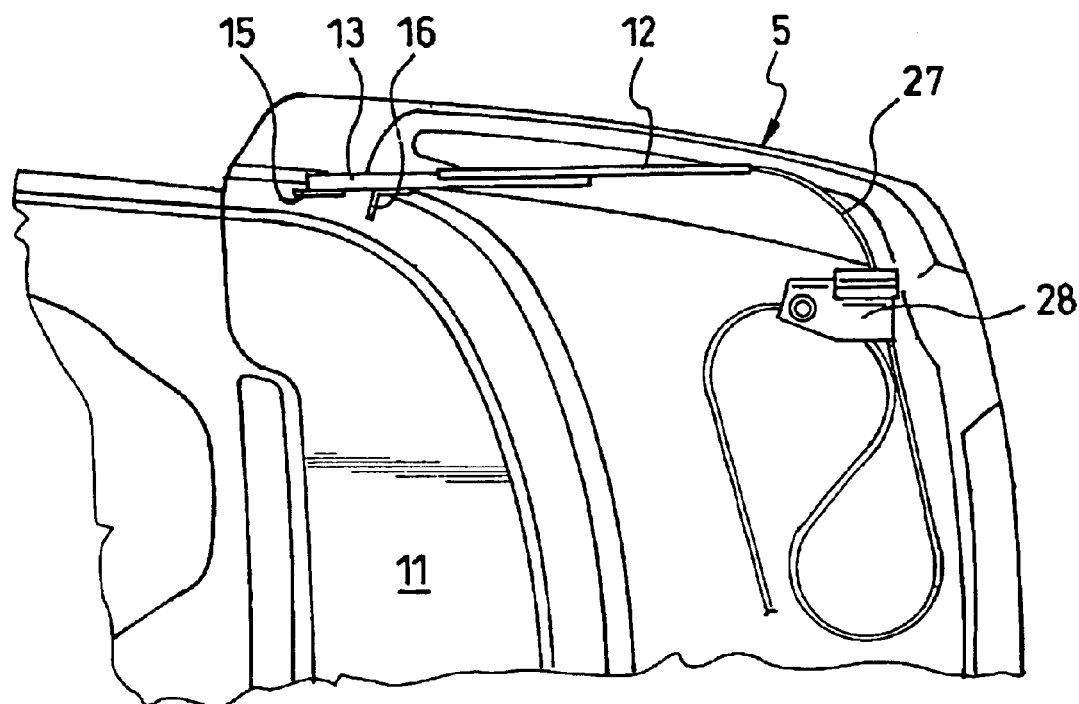
FIG. 9 is a bottom view of the closed trunk lid and the cover of the convertible top compartment in its front covered position.
Figure 10:
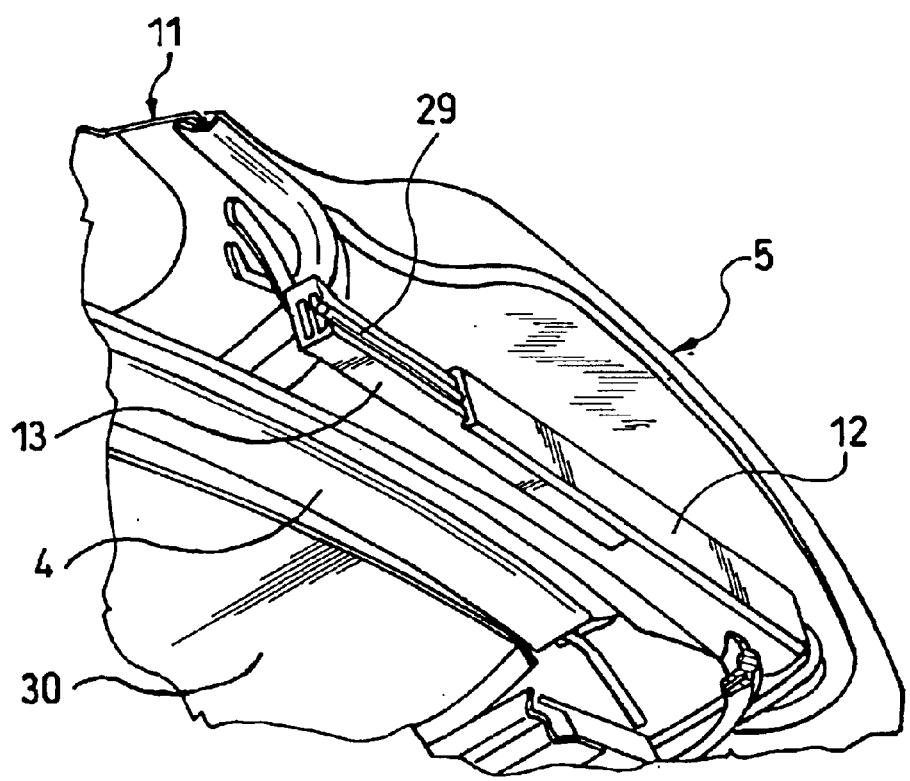
FIG. 10 is a perspective bottom view of the closed trunk lid with the cover of the convertible top compartment in its front covered position, its bearing means being located next to the deposited roof.

Movement of the cover 11 of the convertible top compartment takes place, for example, by means of a compression-tension cable 27, e.g., a Bowden cable (see FIGS. 2 & 9) as is known, for example, for drives for motor vehicle sliding roofs and which, on the one hand, is connected to the slider plate 14, and on the other, to a drive means, for example, an electric motor 28 which is supported on the trunk lid. A guide 29 for the compression-tension cable 27 is located on the inner guide rail 13 (FIG. 10).

In the closed position of the roof 2 (FIGS. 1 & 2) and with the trunk lid 5 closed, the inner guide rail 13 and the slider plate 14 are located in their rear initial position, the inner guide rail 13 being fixed on the external guide rail 12 by a locking means, for example, the locking block mechanism known from published German Patent Application DE 44 27 442 A1 or German Patent DE 197 13 348 C1 and also being permanently connected to the slider plate 14. The front control rod 15 and the rear connecting rod 16 are swung into their lower position, and thus, keep the cover 11 of the convertible top compartment in its pushed-back deposited position under the trunk lid 5.

Figure 4:
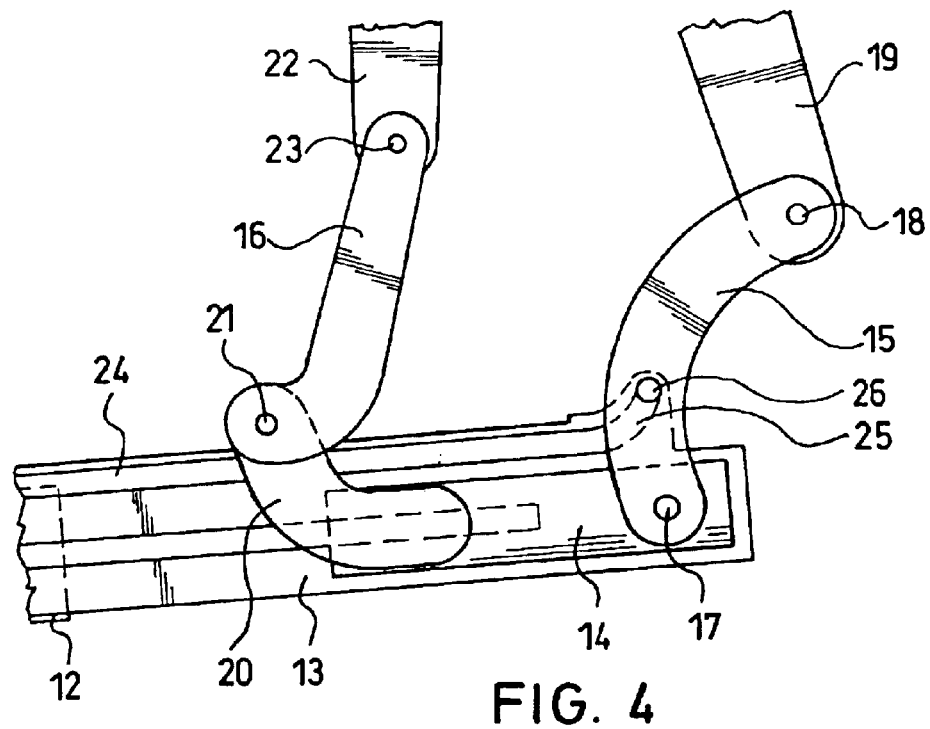
FIG. 4 is an enlarged side view of the bearing means of the cover of the convertible top compartment which is located in the front cover position, which bearing means has a four bar mechanism.
Figure 5:
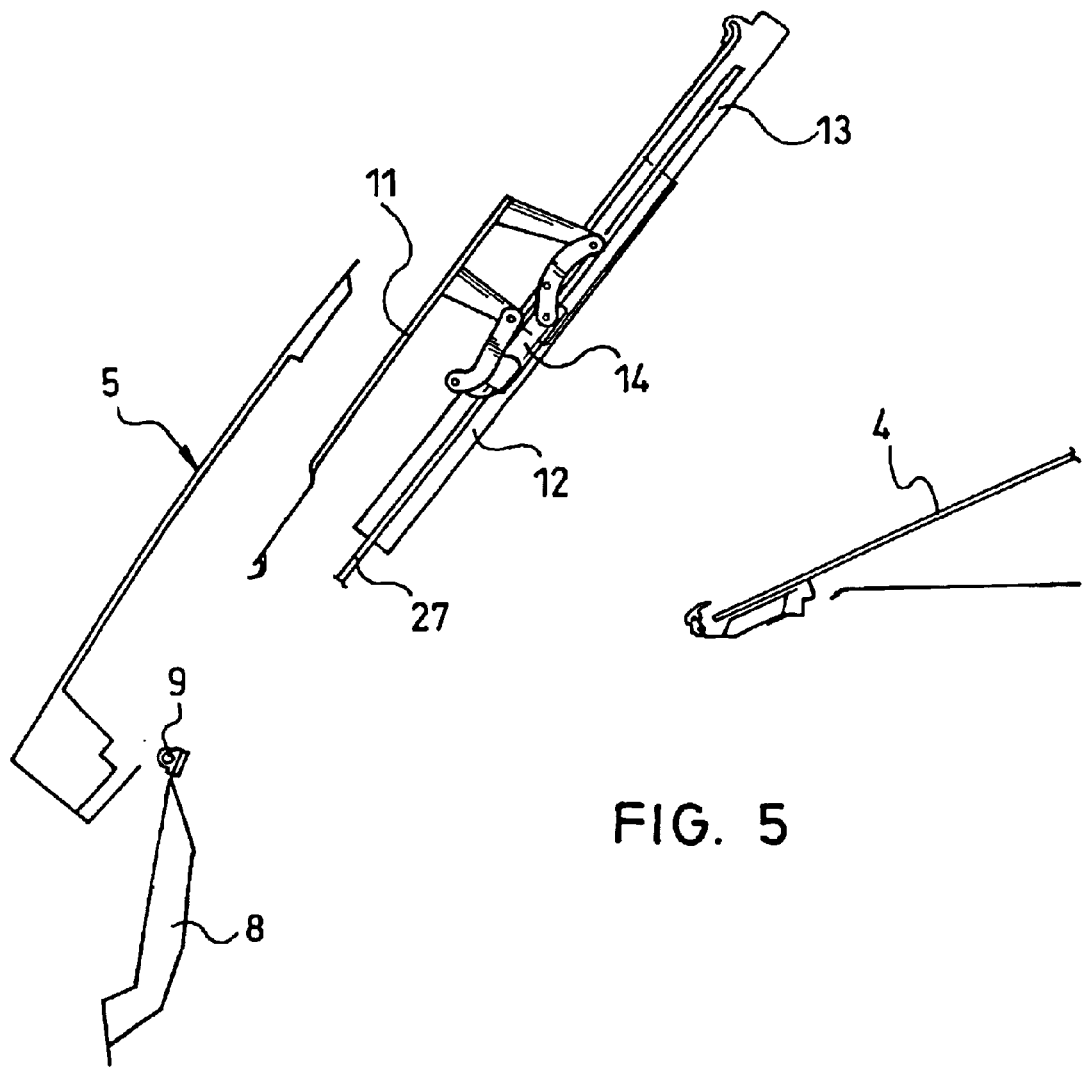
FIG. 5 is a view similar to that shown in FIG. 1, the cover of the convertible top compartment being extended into its front cover position while the trunk lid is swung up.
Figure 6:
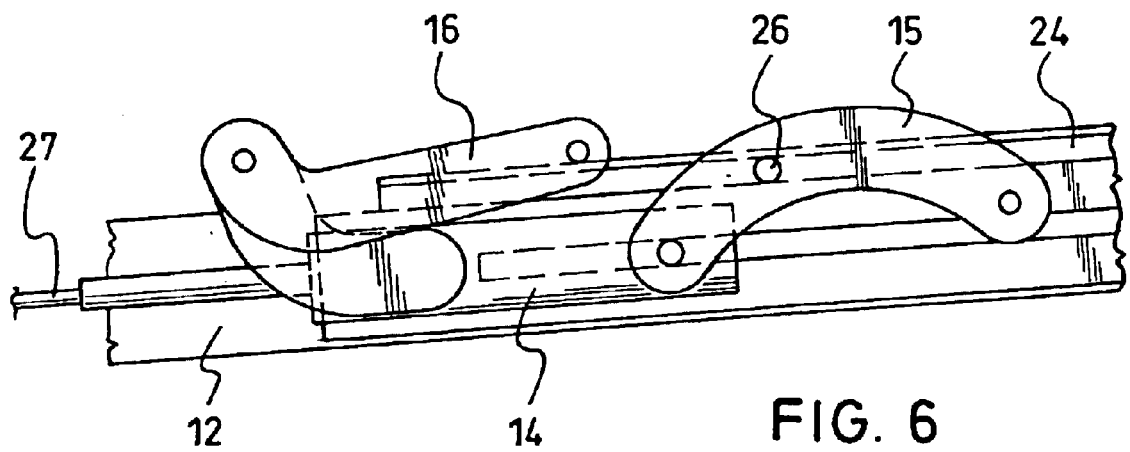
FIG. 6 is an enlarged side view of the four bar mechanism of the bearing means in the intermediate position.
Figure 7:
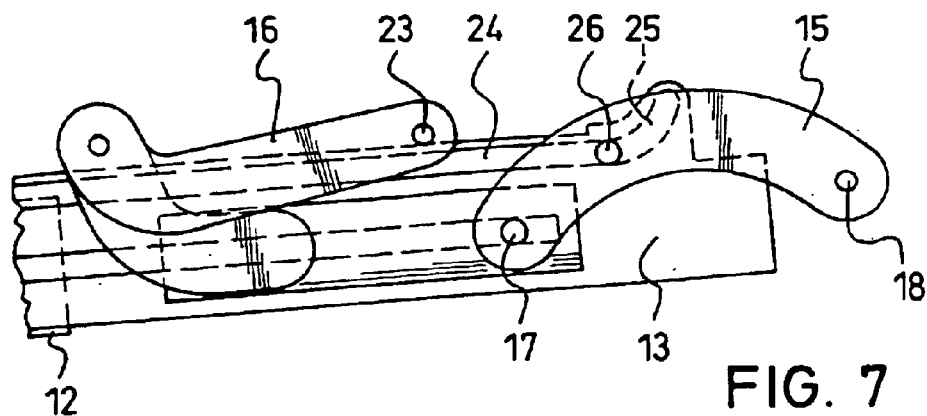
FIG. 7 is a view according to FIG. 6, showing the four bar mechanism shortly before it reaches its front end position.
Figure 8:
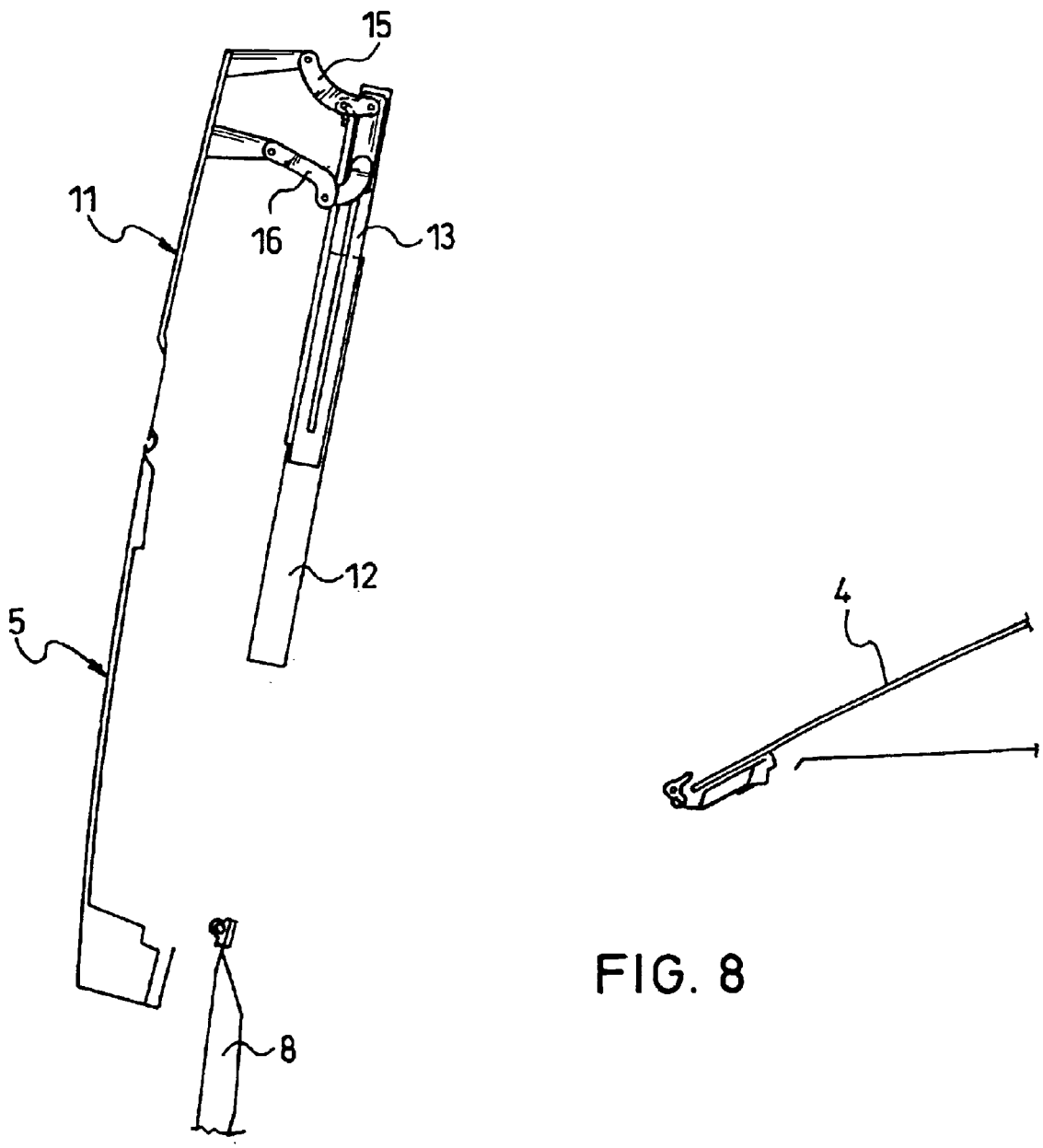
FIG. 8 is a view similar to that shown in FIG. 5, the cover of the convertible top compartment being in its front cover position with the trunk lid swung up.

When the trunk lid 5 is swung up (FIG. 5) by a driving motor (not shown), the slider plate 14 and the inner guide rail 13 which is coupled to it is pushed or telescoped forward along the outer guide rail 12 by means of the compression-tension cable 27. The slider plate 14 has initially cancelled the fixing of the inner guide rail 13 on the outer guide rail 12 by the locking means, but itself remains fixed on the back end of the inner guide rail 13 until the inner guide rail 13 has reached its front end position on the outer guide rail 12 and is locked on it during joint displacement (FIG. 5). By means of further driving motion of the compression-tension cable 27, the slider plate 14 is released from its fixing on the back end of the inner guide rail 13 and is pushed along the inner guide rail 13, the front control rod 15 and the rear connecting rod 16 of the four-bar linkage mechanism remaining in their pivoted-down position until the control pin 26 of the front control rod 15 in the deflection section 25 moves up on the front end of the inner guide rail 13, and thus, swings the front control rod 15 up (FIG. 4). The cover 11 of the convertible top compartment, in its forward cover position on the front edge 10 of the trunk lid 5, is moved up by the four-bar linkage mechanism, where it forms the front extension (FIG. 8).

Now, the roof 2 is lowered in the known manner into the convertible top compartment 3 and then the trunk lid 5 swung back down into its closed position in which the cover 11 of the convertible top compartment closes the opening which is covered by the shelf 30 with the roof 2 closed. The shelf 30 is connected, for example, securely to the rear roof part 4 and is lowered with it, but it can also be an independently moved part.

The illustrated support of the cover 11 of the convertible top compartment can, in general, be a multiple joint device, for example, a septuple linkage mechanism, instead of the four-bar linkage mechanism.

The driving of the cover 11 of the convertible top compartment or its bearing means can also take place via a respective rack which is connected to the slider plate 14 of the respective bearing means. To synchronize the two racks of the right and left bearing means, there can be a shaft which is drive-engaged with the two racks at the same time. Driving takes place by means of a motor which drives a shaft or the like.

In general, there can be an electric, hydraulic, pneumatic or mechanical drive. Alternatively, instead of its own driving means, the driving motion for displacing the cover of the convertible top compartment can be carried out by the drive mechanism for the trunk lid and/or by the driving mechanism for depositing the roof.

Figure 11:
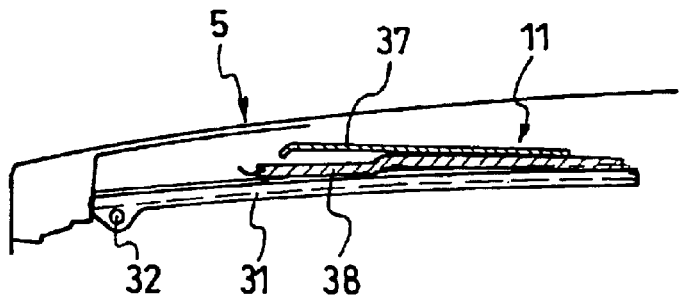
FIG. 11 is a schematic side view of a second embodiment of a bearing means of the cover of the convertible top compartment in accordance with the invention, the cover being shown in the rear deposited position.
Figure 12:
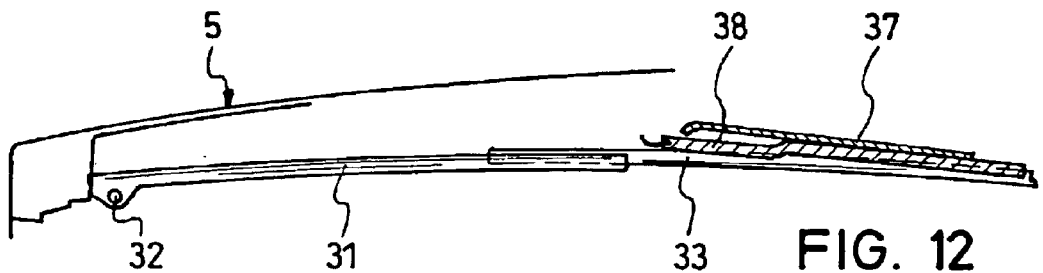
FIG. 12 is a schematic side view as shown in FIG. 11, but with the cover of the convertible top compartment in a first intermediate position.
Figure 13:
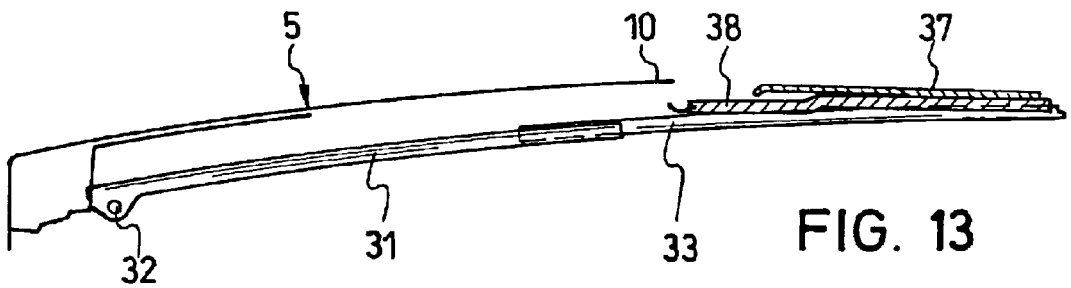
FIG. 13 is a schematic side view as shown in FIG. 11, but with the cover of the convertible top compartment in a second intermediate position.
Figure 14:
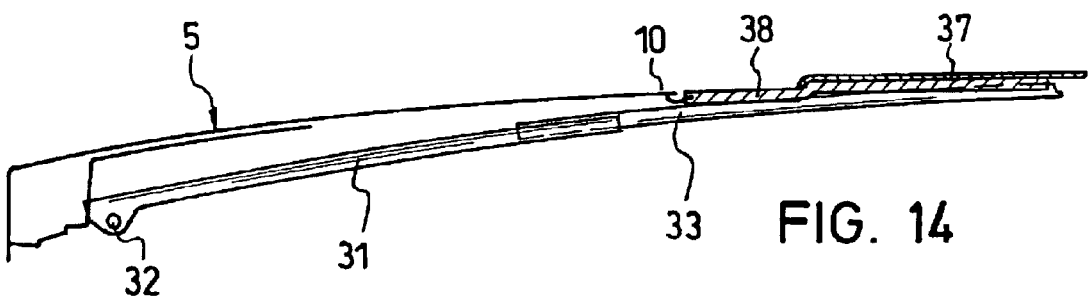
FIG. 14 is a schematic side view as shown in FIG. 11, but with the cover of the convertible top compartment having been swung into its front cover position.

According to another embodiment, the bearing means for the cover 11 of the convertible top compartment contains a rear guide rail 31 which is coupled to pivot around a rear pivot axis 32 on the trunk lid 5. The front guide rail 33 is movably supported on the rear guide rail 31 and can be telescoped forward from the position telescoped into one another (motion from FIG. 11 to FIG. 13). The cover 11 of the convertible top compartment is fixedly or movably supported on the front guide rail 33 so that it travels into its front extended position either by extending the front guide rail 33 or by additional movement on the front guide rail 33, and from which position, it is moved around the pivot axis 32 up into its cover position or expanded position on the front edge 10 of the trunk lid 5 by pivoting the rear guide rail 31. The pivoting of the rear guide rail 31 is carried out, for example, by means of a connecting rod mechanism or a pivoting rail 34 (see FIG. 15) which is movably supported on the rear guide rail 31 and has a journal 35 which fits into the pivoting linkage 36 which is mounted on the trunk lid 5. The pivoting linkage 36 is located at an angle relative to the lengthwise extension of the rear guide rail 31 so that by means of the journal 35 and the pivoting rail 34, the rear guide rail 31 being swung up during the extension of the front guide rail 33 or after extension of the front guide rail 33.

The cover 11 of the convertible top compartment can be formed in two parts or several parts in the lengthwise direction (shown in FIGS. 11 to 15) so that in its rest or deposited position under the trunk lid 5, for example, the front part 37 of the cover 11 of the convertible top compartment is pushed at least partially to the rear over the rear cover part 38 of the cover 11 of the convertible top compartment. When the two-part cover 11 of the convertible top compartment is pushed forward by means of the front guide rail 33, the rear lower cover part 38 is first pushed into its forward position, and then, the front, upper cover part 37 is pushed relative to the rear cover part 37 farther forward into its front end position. The mutual displacement motion of the individual cover parts 37, 38 against one another can take place, for example, by means of a connecting rod connection.

What is claimed is:

1. Cover device for closing and clearing a convertible top compartment for storing of a vehicle roof in a rear area of a body of the convertible motor vehicle, comprising:
    a rear cover part adapted for being movably supported on the vehicle body in an installed state of the cover device,
    a front cover part which is supported on the rear cover part, and
    means for moving the front cover part between a covering position in which it extends forward of the rear cover part, and a deposited position in which it is located under the rear cover part, said means for moving comprising a first bearing means for moving the front cover part relative to the rear cover part in a lengthwise direction and a second bearing means for raising and lowering the front cover relative to the rear cover part.
    wherein the second bearing means is supported on a carriage which is longitudinally movable relative to the first bearing means.

2. Cover device as claimed in claim 1, wherein the first bearing means has a first guide rail which is supported on the rear cover part and a second guide rail which is movably supported on the first guide rail, the second guide rail being forwardly extendable relative to the first guide rail and bearing the front cover part.

3. Cover device as claimed in claim 1, wherein the first guide rail is securely mounted on the rear cover part and the second bearing means is a lifting means for raising and lowering the front cover part.

4. Cover device as claimed in claim 2, wherein the second bearing means is a multiple lever mechanism which supports the front cover part on the second guide rail.

5. Cover device as claimed in claim 4, wherein the multiple lever mechanism is a four bar linkage mechanism.

6. Cover device as claimed in claim 2, wherein the second bearing means is supported on said carriage which is longitudinally movable on the second guide rail.

7. Cover device as claimed in claim 2, wherein the second guide rail has a guide path on which a control part of the first bearing means is engaged, the guide path controlling lifting and lowering of the front cover part.

8. Cover device as claimed in claim 5, wherein the second guide rail has a guide path on which a control part of the four bar linkage mechanism is engaged, the guide path controlling lifting and lowering of the front cover part; wherein the second bearing means is supported on a carriage which is longitudinally movable on the second guide rail, and wherein the four bar linkage mechanism comprises a control rod which contains the control part and a second rod which is pivotally coupled to the carriage and to the front cover part.

9. Cover device as claimed in claim 8, wherein the guide path has a control section on a front section of the second guide rail which deflects the control part upward and pivots the control rod upward when the carriage is moved into a front end position.

10. Cover device as claimed in claim 2, wherein the second bearing means has a pivot bearing which supports a rear section of the first guide rail for a vertical pivoting motion relative to the rear cover part.

11. Cover device as claimed in claim 10, further comprising a displacement mechanism for pivoting the first guide rail in a dynamic connection between the mechanism and the rear cover part.

12. Cover device as claimed in claim 1, wherein the rear cover part is a trunk lid which is pivotably supported for movement around a rear pivot axis on the vehicle body, and wherein the front cover part forms the cover of the convertible top compartment.

13. Cover device as claimed in claim 1, wherein bearing means for the front cover part includes guide rails positioned on right and left edge areas of the front cover part.

14. Cover device as claimed in claim 1, further comprising a drive means with a drive motor and compression-tension cables.

15. Cover device as claimed in claim 14, wherein a coupling means couples the bearing means at each of right and left sides for synchronous movement.

16. Cover device as claimed in claim 1, wherein a drive for displacing the front cover part includes, at least in part, the first bearing means.

17. Convertible motor vehicle, comprising:

a vehicle body with a convertible top compartment in a rear area thereof, a roof for closing and clearing a passenger compartment of the vehicle body, and a cover device for closing and clearing the convertible top compartment, said cover device comprising:

a rear cover part which is movably supported on the vehicle body, a front cover part which is supported on the rear cover part, and means for moving the front cover part between a covering position in which it extends forward of the rear cover part, and a deposited position in which it is located under the rear cover part, said means for moving comprising a first bearing means for moving the front cover part relative to the rear cover part in a lengthwise direction and a second bearing means for raising and lowering the front cover relative to the rear cover part;

wherein the second bearing means is supported on a carriage which is longitudinally movable relative to the first bearing means.

18. Convertible motor vehicle as claimed in claim 17, wherein the first bearing means has a first guide rail which is supported on the rear cover part and a second guide rail which is movably supported on the first guide rail, the second guide rail being forwardly extendable relative to the first guide rail and bearing the front cover part.

19. Convertible motor vehicle as claimed in claim 17, wherein the first guide rail is securely mounted on the rear cover part and the second bearing means is a lifting means for raising and lowering the front cover part.

* * * * *